(12) United States Patent
Chuong et al.

(10) Patent No.: US 10,746,039 B2
(45) Date of Patent: Aug. 18, 2020

(54) HYDROSTATIC SEAL PINNED CARTRIDGE

(71) Applicant: United Technologies Corporation, Farmington, CT (US)

(72) Inventors: Conway Chuong, Manchester, CT (US); Tara L. D'Ambruoso, Oxford, CT (US); Joey Wong, Enfield, CT (US)

(73) Assignee: United Technologies Corporation, Farmington, CT (US)

( * ) Notice: Subject to any disclaimer, the term of this patent is extended or adjusted under 35 U.S.C. 154(b) by 285 days.

(21) Appl. No.: 15/714,360

(22) Filed: Sep. 25, 2017

(65) Prior Publication Data
US 2019/0093495 A1 Mar. 28, 2019

(51) Int. Cl.
*F01D 11/02* (2006.01)
*F16J 15/44* (2006.01)
*F16J 15/447* (2006.01)

(52) U.S. Cl.
CPC .......... *F01D 11/025* (2013.01); *F16J 15/442* (2013.01); *F16J 15/4472* (2013.01); *F05D 2220/32* (2013.01); *F05D 2230/232* (2013.01); *F05D 2230/237* (2013.01); *F05D 2240/55* (2013.01)

(58) Field of Classification Search
CPC ............................ F01D 11/025; F16J 15/442
See application file for complete search history.

(56) References Cited

U.S. PATENT DOCUMENTS

| | | | |
|---|---|---|---|
| 1,035,893 A * | 8/1912 | Miller | E02D 5/803 52/160 |
| 7,735,833 B2 | 6/2010 | Braun et al. | |
| 7,896,352 B2 * | 3/2011 | Justak | F16J 15/442 277/411 |
| 8,002,285 B2 * | 8/2011 | Justak | F01D 11/02 277/412 |
| 8,172,232 B2 * | 5/2012 | Justak | F16J 15/442 277/411 |
| 8,641,045 B2 * | 2/2014 | Justak | F16J 15/442 277/412 |
| 8,919,781 B2 * | 12/2014 | Justak | F01D 11/025 277/411 |
| 9,097,350 B2 | 8/2015 | Dale | |
| 9,611,749 B2 | 4/2017 | Thatte et al. | |
| 9,963,991 B2 * | 5/2018 | Wilson | F01D 11/001 |
| 9,995,163 B2 * | 6/2018 | Chuong | F01D 11/04 |
| 10,030,531 B2 * | 7/2018 | Peters | F03B 3/12 |
| 10,060,535 B2 * | 8/2018 | Simpson | F16J 15/447 |
| 10,094,241 B2 * | 10/2018 | Ackermann | F01D 5/02 |
| 10,100,657 B2 * | 10/2018 | Chuong | F01D 25/24 |

(Continued)

FOREIGN PATENT DOCUMENTS

WO    WO2014150825 A1    9/2014

OTHER PUBLICATIONS

Extended European Search Report for EP Application No. 18184945.6, dated Mar. 25, 2019, 10 pages.

*Primary Examiner* — Kenneth J Hansen
*Assistant Examiner* — Brian O Peters
(74) *Attorney, Agent, or Firm* — Kinney & Lange, P.A.

(57) ABSTRACT

A seal assembly includes a side ring and a cartridge. The side ring comprises an annular piece of solid material. The cartridge is affixed to the side ring and comprises a shoulder, a beam connected to and extending from the shoulder, a shoe attached to an end of the beam, and a rotary seal disposed on a bottom portion of the shoe.

15 Claims, 3 Drawing Sheets

(56) References Cited

U.S. PATENT DOCUMENTS

| | | | |
|---|---|---|---|
| 10,107,126 B2* | 10/2018 | Ackermann | F01D 5/087 |
| 10,119,474 B2* | 11/2018 | Hyland | F01D 19/00 |
| 10,184,347 B1* | 1/2019 | D'Ambruoso | F01D 11/003 |
| 10,221,714 B2* | 3/2019 | Peters | F01D 5/02 |
| 10,337,621 B2* | 7/2019 | D'Ambruoso | F01D 11/025 |
| 10,370,991 B2* | 8/2019 | Wilson | F01D 11/001 |
| 10,370,996 B2* | 8/2019 | Wilson | F01D 5/02 |
| 10,385,715 B2* | 8/2019 | Wong | F01D 5/02 |
| 2010/0164180 A1 | 7/2010 | Short | |
| 2011/0121519 A1 | 5/2011 | Justak | |
| 2012/0090943 A1* | 4/2012 | Copeland | F16D 13/648 192/70.11 |
| 2015/0285152 A1* | 10/2015 | Hayford | F02C 7/28 415/171.1 |
| 2015/0322816 A1* | 11/2015 | Schmitz | F01D 1/04 60/796 |
| 2016/0102570 A1* | 4/2016 | Wilson | F01D 11/02 277/411 |
| 2016/0108750 A1* | 4/2016 | Wilson | F01D 11/00 277/411 |
| 2016/0109025 A1* | 4/2016 | McCaffrey | F01D 11/025 277/411 |
| 2016/0115804 A1* | 4/2016 | Wilson | F01D 11/00 277/503 |
| 2016/0130963 A1 | 5/2016 | Wilson et al. | |
| 2017/0009596 A1* | 1/2017 | Schwarz | B64D 27/10 |
| 2017/0051751 A1* | 2/2017 | Ackermann | F01D 5/06 |
| 2017/0211406 A1 | 7/2017 | Peters | |
| 2017/0226883 A1* | 8/2017 | Peters | F01D 11/025 |
| 2018/0045066 A1* | 2/2018 | Chuong | F01D 11/025 |
| 2018/0058238 A1* | 3/2018 | Wong | F01D 5/02 |
| 2018/0058239 A1* | 3/2018 | Paulino | F01D 5/02 |
| 2018/0058240 A1* | 3/2018 | Chuong | F01D 5/02 |
| 2018/0363562 A1* | 12/2018 | Chuong | F02C 7/28 |
| 2019/0017403 A1* | 1/2019 | Chuong | F01D 11/025 |
| 2019/0017404 A1* | 1/2019 | Chuong | F01D 11/10 |
| 2019/0017606 A1* | 1/2019 | Chuong | F01D 11/025 |
| 2019/0017607 A1* | 1/2019 | Chuong | F16J 15/441 |
| 2019/0093495 A1* | 3/2019 | Chuong | F01D 11/025 |

* cited by examiner

HYDROSTATIC SEAL PINNED CARTRIDGE

STATEMENT OF GOVERNMENT INTEREST

This invention was made with government support under FA8626-16-C-2139 awarded by the United States Air Force. The government has certain rights in the invention.

BACKGROUND

The present disclosure relates generally to seal assemblies, and more particularly to floating non-contact seals for use in gas turbine engines.

Honeycomb and knife-edge seals can be used to form a seal at the interface between rotating and static components within the turbine section of a gas turbine engine. Over time, the knife-edge seal can wear a trench into the honeycomb causing gaps and sporadic leaks.

Floating non-contact seal (a.k.a., hydrostatic seal) configurations allow radial motion of shoe components relative to a rotating component. Floating non-contact seals can vary a gap between the sealing element and a rotating component by adjusting in response to to the change in pressure across the sealing element. A shoe component of the floating non-contact seal is drawn radially inward and outward (toward and away) from the rotating component in response to the pressure across the sealing element. In hydrostatic seals, a full ring portion of the seal connects to the beams and shoes of the seal. A full ring is needed to hold all of the shoes together, with respect to each other, in order to function properly as a full ring seal. In existing designs, this full ring is located outboard of and made integrally with the beams and the shoes. This location of the full ring adds considerable radial height to the seal assembly negatively impacting packaging within the turbine and jeopardizing beam thickness optimization that may degrade the performance and life of the seal system.

Structures and configurations of floating non-contact seals are the subject of the following commonly owned U.S. Patent Publications US2016/0130963A1, US2015/0322816A1, and US2015/0285152A1 (incorporated by reference herein in their entireties).

SUMMARY

A seal assembly includes a side ring and a cartridge. The side ring comprises an annular piece of solid material. The cartridge is affixed to the side ring and comprises a shoulder, a beam connected to and extending from the shoulder, a shoe attached to an end of the beam, and a rotary seal disposed on a bottom portion of the shoe.

A seal assembly for use in a gas turbine engine includes a rotating structure, a static structure, a floating non-contact seal, and a carrier. The static structure is aligned with the rotating structure along a radial direction. The floating non-contact seal is disposed between the rotating structure and the static structure and comprises a side ring, a spring, a shoe, a seal element, and a pin. The side ring includes a first axial end-face and a second axial end-face. The spring is affixed to the second end-face of the side ring via a removable pin. The shoe is disposed radially inward of and connected to the spring. The seal element is extending radially inward from the shoe. The pin extends through a portion of the spring and through a portion of the side ring such that the pin affixes the spring to the side ring.

A method includes rotating a rotating structure relative to a static structure while providing a seal assembly between the rotating structure and the static structure. The seal assembly includes a side ring and a floating non-contact seal cartridge. The side ring includes a first axial end-face and a second axial end-face. The floating non-contact seal cartridge is disposed radially between the rotating structure and the static structure. The floating non-contact seal cartridge is affixed to the second end-face of the side ring via a pin inserted into portions of the side ring and the floating non-contact seal cartridge. The floating non-contact seal cartridge includes a shoulder, a beam extending from the shoulder, a shoe disposed radially inward of and connected to the beam, and a seal element extending radially inward from the shoe. Air is flowed from an upstream side of the seal assembly, across the floating non-contact seal cartridge, and to a downstream side of the seal assembly. The shoe is actuated at least one of radially outward and radially inward. The floating non-contact seal cartridge is supported with the pin.

DETAILED DESCRIPTION

Figure 1:
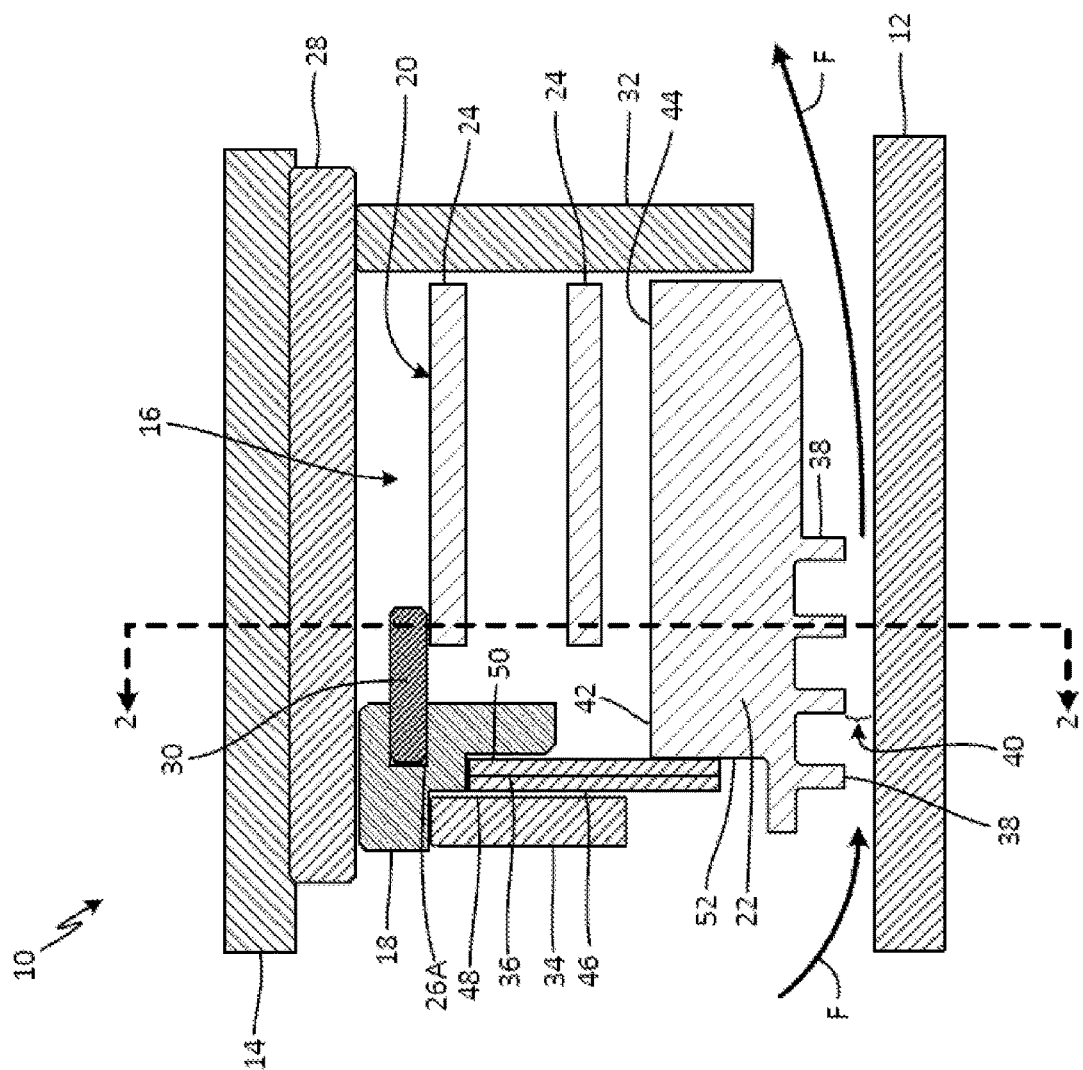
FIG. 1 is a cross-section view of a seal assembly with a rotating structure, a static structure, a floating non-contact seal, and a side ring.
Figure 2:
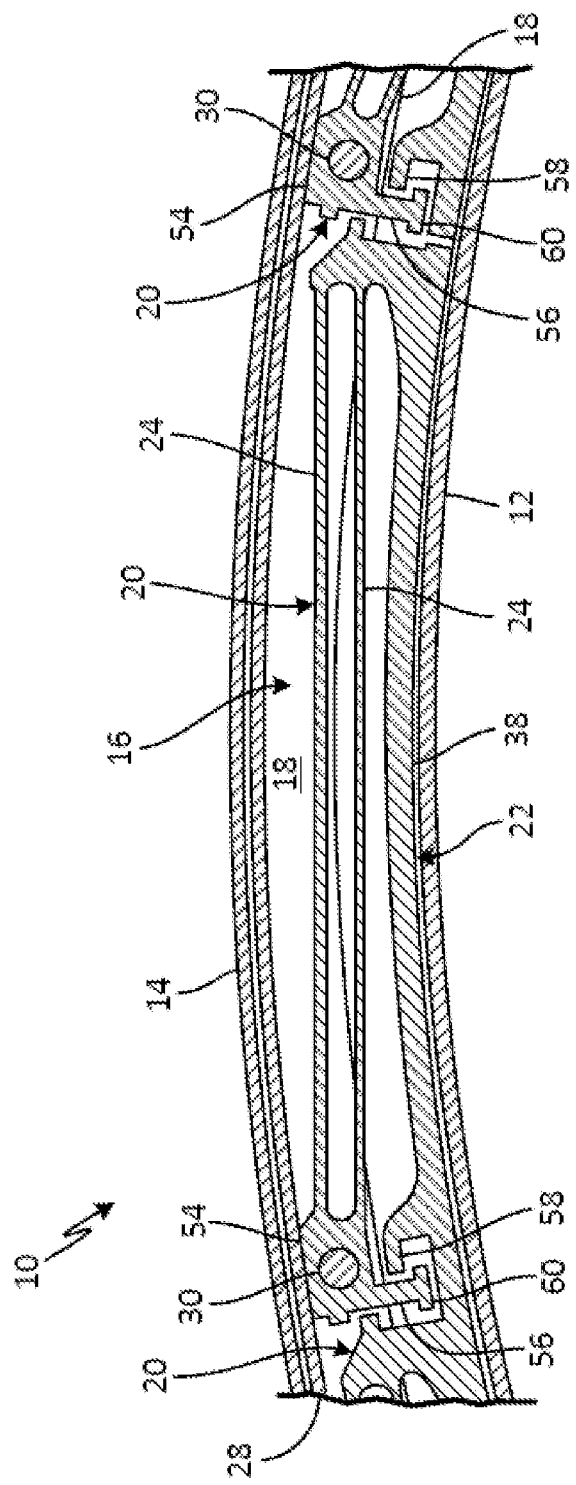
FIG. 2 is a partial cross-section view of the seal assembly with the rotating structure, the static structure, the floating non-contact seal, and the side ring taken along 2-2 in FIG. 1 and such that an upstream direction is into the page.
Figure 3:
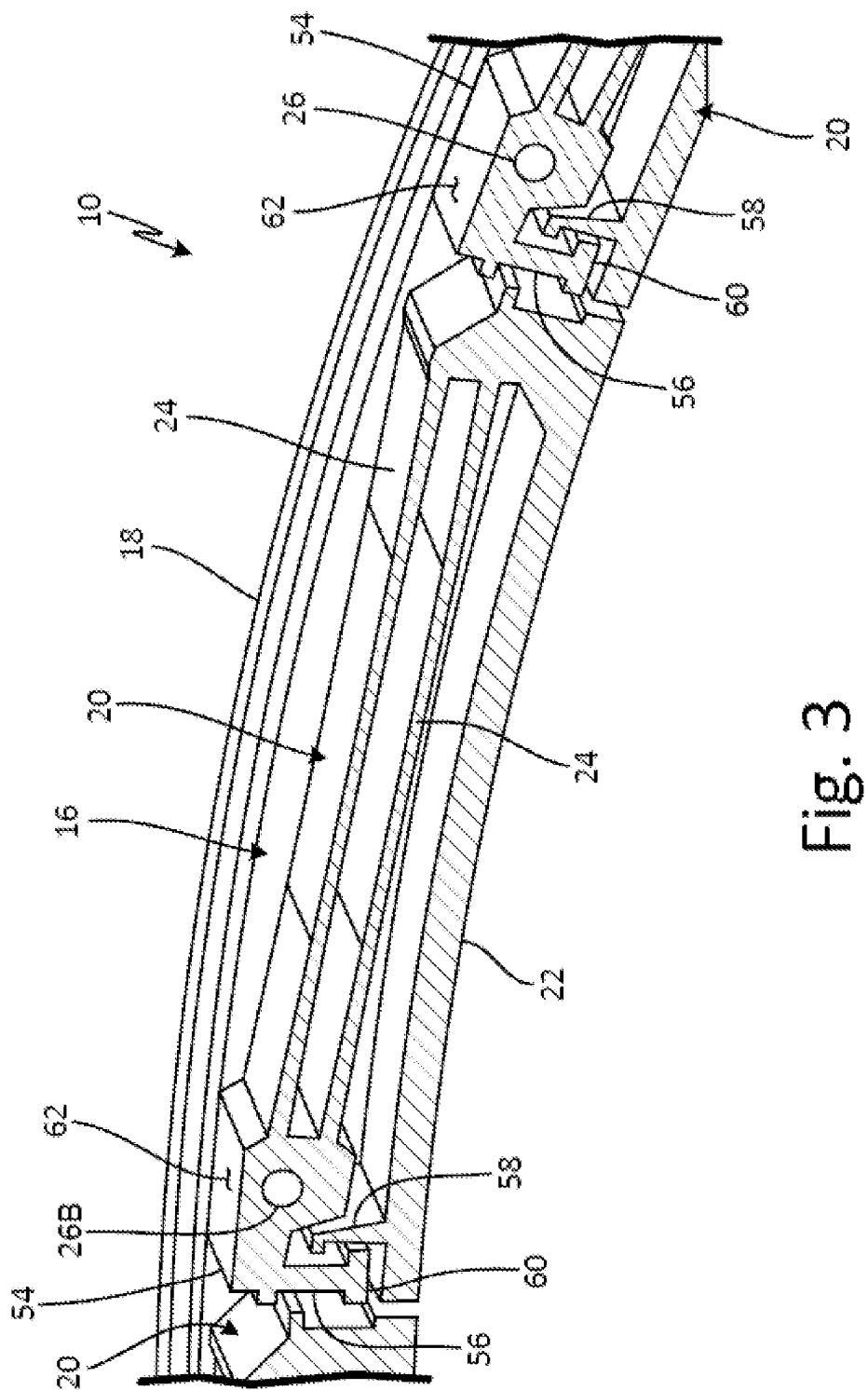
FIG. 3 is a partial perspective view of the floating non-contact seal.

FIGS. 1, 2, and 3 show different aspects of seal assembly 10 with rotating structure 12, static structure 14, floating non-contact seal 16, and side ring 18 are discussed as a group below. FIG. 1 is cross-section view of seal assembly 10 such that a downstream direction is left to right in FIG. 1. FIG. 2 is a partial cross-section view of seal assembly 10 taken along 2-2 in FIG. 1 and the view shown in FIG. 2 is taken of seal assembly 10 facing in an axial direction into (or out of) the page such that an upstream direction is into the page. Additionally, the view of seal assembly 10 in FIG. 2 represents a portion of an entire circumference of seal assembly 10 which extends in a complete annulus, circle, or ring. FIG. 3 is a partial perspective view of seal assembly 10 with rotating structure 12 and static structure 14 omitted for clarity. As discussed in U.S. Patent Publications US2016/0130963A1, US2015/0322816A1, and US2015/0285152A1, seal assembly 10 with floating non-contact seal 16 can be located within the turbine section of a gas turbine engine.

Seal assembly 10 includes rotating structure 12, static structure 14, floating non-contact seal 16, and side ring 18. Floating non-contact seal 16 includes cartridges 20 each with shoe 22 and beams 24. Side ring 18 includes hole 26A. Seal assembly 10 further includes carrier 28, pin 30, plate 32, seal cover 34, and seals 36. Shoe 22 includes teeth 38. A space between rotating structure 12 and teeth 38 forms gap 40. Shoe 22 includes upstream portion 42 and downstream portion 44. Seal assembly 10 additionally includes upstream face 46 of seals 36, downstream face 48 of seal cover 34, downstream face 50 of seals 36, and upstream face 52 of shoe 22. FIG. 2 shows seal assembly 10 additionally including shoulders 54, stems 56, arms 58, and extensions 60.

Rotating structure 12 includes a structure of a gas turbine engine that is rotating. In one non-limiting embodiment, rotating structure 12 can include a rotor of a compressor section or a turbine section of a gas turbine engine. Static structure 14 includes a structure of a gas turbine engine that is static or not-rotating. In one non-limiting embodiment, static structure 14 can include a stator of a compressor section or a turbine section of a gas turbine engine. Floating non-contact seal 16 includes a hydrostatic fluid seal. In one non-limiting embodiment, floating non-contact seal 16 can be made out of a nickel alloy material, such as an austenitic nickel-based superalloy, or other metallic alloys favorable for use in high temperature applications. Side ring 18 includes a generally annulus or ring of solid material.

Cartridge 20 includes a discrete module or independent unit of a hydrostatic seal (e.g., of floating non-contact seal 16). Cartridge 20 includes a portion of the full circumferential ring of floating non-contact seal 16. Shoe 22 includes a solid piece of material with a partially annular shape and a generally rectangular shaped cross-section (from the viewpoint of looking into the page in FIG. 1). Shoe 22 also includes upstream portion 42 and downstream portion 44. Beams 24 include elongate resilient elements or springs capable of springing back into shape upon radial deflection (upward or downward in FIGS. 1 and 2). Hole 26A includes a narrow aperture or opening.

Carrier 28 includes an annular ribbon or sleeve of solid material. Pin 30 includes a peg or dowel of solid material. In other non-limiting embodiments, pin 30 can be replaced with a braze or weld joint. Plate 32 includes a ring-shaped plate of solid material. Plate 32 includes scallops or holes (not shown in FIG. 1) along plate 32. Seal cover 34 includes a ring of solid material. Seals 36 include ring-shaped, or partially ring-shaped, pieces of pliant solid material, which can include a cobalt alloy or other types of metallic alloys suitable for wear resistance. Seals 36 extend in a vertical direction as shown in FIG. 1. Teeth 38 include solid pieces of material connected to and extending radially inward (downward in FIGS. 1 and 2) from shoe 22 towards rotating structure 12. Gap 40 includes a space between teeth 38 and rotating structure 12.

Upstream portion 42 of shoe 22 includes a portion of shoe 22 that is located on an upstream (to the left in FIG. 1) end of shoe 22. Downstream portion 44 of shoe includes a portion of shoe 22 that is located on a downstream (to the right in FIG. 1) end of shoe 22. Upstream face 46 includes a face of seals 36 that faces in an upstream direction and is located at an upstream end of seals 36. Downstream face 48 includes a face of seal cover 34 that faces in a downstream direction and is located at a downstream end of seal cover 34. Downstream face 50 includes a face of seals 36 that faces in a downstream direction and is located at a downstream end of seals 36. Upstream face 52 includes a face of shoe 22 that faces in an upstream direction and is located on upstream portion 42 of shoe 22.

As shown in FIG. 2, shoulders 54 include a corner portion or bend in cartridge 20. Stems 56 include solid ribbon-shaped pieces of material that extend along an axial length of shoe 22. Arms 58 include lips formed of solid material that extend partially radially outward from shoe 22. Extensions 60 include a T-shaped piece of solid material.

Rotating structure 12 is disposed radially within floating non-contact seal 16 and static structure 14. In other non-limiting embodiments, static structure 14 can be disposed radially within rotating structure 12 with floating non-contact seal 16 disposed between rotating structure 12 and static structure 14. Static structure 14 is radially aligned with the rotating structure 12 such that static structure 14 and rotating structure 12 are aligned in a direction extending radially outward from rotating structure 12. Floating non-contact seal 16 is disposed radially between rotating structure 12 and static structure 14. In one non-limiting embodiment, floating non-contact seal 16 is attached to static structure 14 such that rotating structure 12 rotates relative to static structure 14 and floating non-contact seal 16 during operation of seal assembly 10. Floating non-contact seal 16 is disposed axially downstream of side ring 18 and is attached or affixed to side ring 18 via pins 30. In another non-limiting embodiment, side ring 18 can be disposed on an axially downstream side of floating non-contact seal 16.

Side ring 18 is connected, affixed, or attached to cartridges 20 of floating non-contact seal 16 by pins 30. In one non-limiting embodiment, side ring 18 is positioned between cartridge 20 and seals 36 creating axial spacing between beams 24 and seals 36.

Each of cartridges 20 are disposed circumferentially adjacent to another cartridge 20 (as shown in FIGS. 2 and 3). Shoe 22 is connected to an end of beams 24 opposite from shoulder 54. In one non-limiting embodiment, cartridge 20 includes beams 24 which extend in a direction (shown in FIG. 2 as horizontal) orthogonal to the axial direction (in to or out of the page in FIG. 2) of seal assembly 10. Beams 24 are integrally formed with shoe 22 such that shoe 22 and beams 24 can be formed out of a single piece of continuous material. Beams 24 include a dual-beam design in FIG. 2 which causes shoe 22 to move in a radial direction. In other non-limiting embodiments, beams 24 can include more or less than two beams. In one non-limiting embodiment, the entire circumference of floating non-contact seal 16 can include approximately fifty shoes and corresponding sets of beams 24. Hole 26B extends axially into a portion of floating non-contact seal 16 (shown in FIG. 3). Hole 26A extends axially into side ring 18 (shown in FIG. 1).

Carrier 28 includes a support ring for securing floating non-contact seal 16 to static structure 14. Carrier 28 is positioned radially between static structure 14 and floating non-contact seal 16. In other non-limiting embodiments, carrier 28 can be a part of static structure 14. Pin 30 is inserted in hole 26A of side ring 18 and in hole 26B of floating non-contact seal 16. Pin 30 affixes or attaches floating non-contact seal 16 to side ring 18. In the particular cross-section view of FIG. 1, pin 30 is shown as inserted into hole 26A of side ring 18 and is shown as not engaged with floating non-contact seal 16 for clarity. In another non-limiting embodiment, pin 30 is located and is inserted in hole 26A in floating non-contact seal 16 (e.g., as shown in FIGS. 2 and 3). Plate 32 is disposed along a downstream side of side beams 24 and shoe 22. The scallops or holes of plate 32 allow for fluid communication across plate 32. Seal cover 34 is disposed axially upstream of seals 36.

Seals 36 are disposed axially upstream of beams 24 and come into contact with shoe 22. A portion of seals 36 are positioned between seal cover 34 and side ring 18. Seals 36 are disposed between seal cover 34 and shoe 22 such that upstream face 46 of seals 36 is out of contact with downstream face 48 of seal cover 34 and downstream face 50 of seals 36 is in contact with upstream face 52 of shoe 22. Upstream face 52 of shoe 22 includes a face of shoe 22 that faces in an upstream direction (to the left in FIG. 1) and is located downstream of a furthest upstream portion of shoe 22. Teeth 38 extend radially inward from shoe 22 and into gap 40. Gap 40 is formed between teeth 38 and rotating structure 12 for allowing air flow F to pass across floating non-contact seal 16 in a downstream direction (as shown by the direction of the arrowheads of air flow F). In FIG. 2, a direction of fluid flow is out of the page.

Shoulders 54 are connected to beams 24 and stems 56. Shoulders 54 are in contact with carrier 28 on a radially outward side of shoulders 54. Stems 56 are connected to and extend radially inward from shoulders 54. Arms 58 are attached to, or formed as a part of, shoe 22. Arms 58 form a notch with shoe 22 creating a space for extensions 60 to be disposed in. Spacing is provided between extensions 60 and arms 58 to allow arms 58 to move as shoe 22 moves radially inward or outward. Extensions 60 are connected to side ring 18 by stems 56.

During operation of seal assembly 10, floating non-contact seal 16 forms a seal with rotating structure 12 to control an amount of fluid and fluid pressure travelling past floating non-contact seal 16 between components of a gas turbine engine. Floating non-contact seal 16 adjusts in response to the change in pressure across floating non-contact seal 16 by drawing shoe 22 towards or away from rotating structure 12 to adjust gap 40 between shoe 22 and rotating structure 12.

During operation of seal assembly 10, floating non-contact seal 16 regulates air flow F from a high pressure side of floating non-contact seal 16 (to the left in FIG. 1) to a low pressure side of floating non-contact seal 16 (to the right in FIG. 1). As air flow F flows past teeth 38 of floating non-contact seal 16, a pressure field across seal assembly 10 changes. Shoe 22 is drawn towards or away from rotating structure 12 due to a pressure differential across a radially inward side and a radially outward side of shoe 22. If the pressure differential across shoe 22 is high, for example a pressure in first channel 46 is much lower than a pressure between shoe 22 and rotating structure 12, shoe 22 is pushed by the high pressure in a radially outward direction to allow the high pressure flow to release into the area of low pressure through plate 32 and into first channel 46. If the pressure differential across shoe 22 is low, for example the pressure in first channel 46 is greater than the pressure between shoe 22 and rotating structure 12, the radially outward force applied to shoe 22 is lessened which lowers the shoe radially inward towards rotating structure 12 restricting and thereby reducing the amount of flow F allowed past shoe 22, through plate 32, and into first channel 46.

Radially inward and outward motion of shoe 22 is limited by the configuration of stems 56, arms 58, and extensions 60. As shoe 22 moves radially outward, arms 58 come into contact with side ring 18 which prevents a large clearance between shoe 22 and rotating structure 12 from occurring. Conversely, as shoe 22 moves radially inward, arms 58 come into contact with extensions 60 preventing teeth 38 of shoe 22 from coming into contact with rotating structure 12.

As the pressure differential across floating non-contact seal 16 balances out, shoe 22 actuates radially outward and inward (upward and downward in FIGS. 1 and 2) until pressure equilibrium is achieved, for example a pressure of upstream of shoe 22 and a pressure downstream of shoe 22 becomes equal. The pressure equilibrium across floating non-contact seal 16 results in a force balance allowing floating non-contact seal 16 to adjust a size of gap 40 and maintaining tighter clearances between teeth 38 of shoe 22 and rotating structure 12. As shoe 22 actuates up and down, seals 36 slide along shoe 22 to maintain sealing and force balances.

Side ring 18 functions to brace or hold in place each of cartridges 20. Side ring 18 extends for the entire circumference of floating non-contact seal 16. During operation of seal assembly 10, side ring 18 holds shoulder 54 of cartridge 20 against carrier 28 so as to prevent rotation of cartridge 20. Side ring 18 also acts as a spacer component and houses seals 36 and seal cover 34.

In prior art seal assemblies, a full ring is located radially outward of and formed integrally with the beams and shoes so as to hold the beams and shoe in place relative to the rotating component. This location of the full ring adds considerable radial height to the seal assembly adding volume and weight to the assembly. In turbine engines, packaging of the assembly within the turbine becomes an issue, as parts need to be thinned out or reconfigured to fit properly. Additionally, an amount of space for beam thickness optimization is jeopardized, which may degrade the performance and life of the seal assembly.

Use of side ring 18 allows removal of a full ring located radially outward from floating non-contact seal 16 such that a radial height of seal assembly 10 is reduced. This allows floating non-contact seal 16 to be fit into smaller design envelopes within the turbine section of the turbine engine. Side ring 18 also allows for the use of separate cartridges 20 pinned in place and that are easily removable and/or replaceable in the event of damage or overhaul. Separate cartridges 20 also facilitate manufacturing capability and access for machining of beams 24 and teeth 38.

Discussion of Possible Embodiments

The following are non-exclusive descriptions of possible embodiments of the present invention.

A seal assembly includes a side ring and a cartridge. The side ring comprises an annular piece of solid material. The cartridge is affixed to the side ring and comprises a shoulder, a beam connected to and extending from the shoulder, a shoe attached to an end of the beam, and a rotary seal disposed on a bottom portion of the shoe.

The seal assembly of the preceding paragraph can optionally include, additionally and/or alternatively, any one or more of the following features, configurations and/or additional components.

The cartridge can comprise a portion of a hydrostatic seal.

The seal assembly can be configured to be disposed in a turbine section of a gas turbine engine.

A secondary seal can be in contact with a portion of the side ring and the shoe, a seal cover can be in contact with a portion of the side ring such that the seal cover retains the secondary seal against the side ring, a carrier can be disposed radially outward from the cartridge, and a seal plate can be disposed on an axial end of the seal assembly, wherein the seal plate can be in contact with the carrier.

The cartridge can be affixed to the side ring via mechanical attachment.

A removable pin can engage with the cartridge and/or the side ring such that a portion of the cartridge can be fastened to the side ring.

The side ring can have a hole, and wherein the pin can extend through a portion of the shoulder and/or into the hole of the side ring.

The cartridge can be affixed to the side ring via chemical attachment.

The cartridge can be affixed to the side ring by welding or brazing.

The floating non-contact seal can comprise a plurality of removable cartridges that can form an annular rotary seal configured to sealing engage with a rotating structure.

A seal assembly for use in a gas turbine engine includes a rotating structure, a static structure, a floating non-contact seal, and a carrier. The static structure is aligned with the rotating structure along a radial direction. The floating non-contact seal is disposed between the rotating structure and the static structure and comprises a side ring, a spring, a shoe, a seal element, and a pin. The side ring includes a first axial end-face and a second axial end-face. The spring is affixed to the second end-face of the side ring via a removable pin. The shoe is disposed radially inward of and connected to the spring. The seal element is extending radially inward from the shoe. The pin extends through a portion of the spring and through a portion of the side ring such that the pin affixes the spring to the side ring.

The seal assembly of the preceding paragraph can optionally include, additionally and/or alternatively, any one or more of the following features, configurations and/or additional components.

The seal assembly can be disposed in a turbine section of the gas turbine engine.

The floating non-contact seal can comprise a portion of a hydrostatic seal.

The floating non-contact seal can comprise a plurality of removable cartridges that can form an annular rotary seal configured to sealing engage with the rotating structure.

The spring can comprise a shoulder and/or a plurality of beams connected to and/or extending from the shoulder.

The side ring can have a hole, and wherein the pin can extend through a portion of the shoulder and/or into the hole of the side ring.

A method includes rotating a rotating structure relative to a static structure while providing a seal assembly between the rotating structure and the static structure. The seal assembly includes a side ring and a floating non-contact seal cartridge. The side ring includes a first axial end-face and a second axial end-face. The floating non-contact seal cartridge is disposed radially between the rotating structure and the static structure. The floating non-contact seal cartridge is affixed to the second end-face of the side ring via a pin inserted into portions of the side ring and the floating non-contact seal cartridge. The floating non-contact seal cartridge includes a shoulder, a beam extending from the shoulder, a shoe disposed radially inward of and connected to the beam, and a seal element extending radially inward from the shoe. Air is flowed from an upstream side of the seal assembly, across the floating non-contact seal cartridge, and to a downstream side of the seal assembly. The shoe is actuated at least one of radially outward and radially inward. The floating non-contact seal cartridge is supported with the pin.

The method of the preceding paragraph can optionally include, additionally and/or alternatively, any one or more of the following steps, features, configurations and/or additional components.

Supporting the cartridge with the pin can further comprise preventing relative motion between the shoulder of the floating non-contact seal cartridge and the side ring with the pin by way of the pin affixing the floating non-contact seal cartridge to the side ring.

A radially outward surface of the shoulder can be held against a carrier disposed radially between the floating non-contact seal cartridge and the static element.

The seal assembly can be used within a turbine section of a gas turbine engine.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A seal assembly comprising:
   a side ring, wherein the side ring comprises an annular piece of solid material;
   a plurality of cartridges affixed to the side ring, wherein each cartridge of the plurality of cartridges includes a discrete module that is disconnected from an adjacent cartridge, wherein each cartridge of the plurality of cartridges comprises:
      a shoulder;
      a beam connected to and extending from the shoulder;
      a shoe attached to an end of the beam; and
      a rotary seal disposed on a bottom portion of the shoe; and
   a removable pin, wherein the removable pin extends into a portion of one of the plurality of cartridges and into a portion of the side ring such that the cartridge is fastened to the side ring, wherein the side ring has a first hole, wherein the shoulder has a second hole, wherein the second hole is a circular hole disposed in and circumferentially surrounded by physical material of the cartridge, and wherein the removable pin extends into the second hole of the shoulder and into the first hole of the side ring.

2. The seal assembly of claim 1, wherein each cartridge of the plurality of cartridges comprises an independent unit of a hydrostatic seal.

3. The seal assembly of claim 1, wherein the seal assembly is configured to be disposed in a turbine section of a gas turbine engine.

4. The seal assembly of claim 1 and further comprising:
   a secondary seal in contact with a portion of the side ring and the shoe;
   a seal cover in contact with a portion of the side ring such that the seal cover retains the secondary seal against the side ring;
   a carrier disposed radially outward from all of the plurality of cartridges; and
   a seal plate disposed on an axial end of the seal assembly, wherein the seal plate is in contact with the carrier.

5. The seal assembly of claim 1, wherein each cartridge of the plurality of cartridges is affixed to the side ring via mechanical attachment.

6. The seal assembly of claim 1, wherein the plurality of cartridges form an annular rotary seal configured to engage with a rotating structure in a seal.

7. A seal assembly for use in a gas turbine engine, the seal assembly comprising:
   a rotating structure;
   a static structure aligned with the rotating structure along a radial direction;
   a floating non-contact seal disposed between the rotating structure and the static structure, the floating non-contact seal comprising:
      a side ring with a first axial end-face and a second axial end-face;
      a spring affixed to the second end-face of the side ring via a pin;
      a shoe disposed radially inward of and connected to the spring;
      a plurality of cartridges that form an annular rotary seal configured to sealing engage with the rotating structure, wherein each cartridge of the plurality of cartridges includes a discrete module that is disconnected from an adjacent cartridge;
a seal element extending radially inward from the shoe; and
the pin extending into a portion of the spring and into a portion of the side ring such that the cartridge is fastened to the side ring, wherein the side ring has a first hole, wherein a shoulder of one of the plurality of cartridges has a second hole, wherein the second hole is a circular hole disposed in and circumferentially surrounded by physical material of the one of the plurality of cartridges, wherein the pin affixes the spring to the side ring; and
a carrier disposed radially between and in contact with the static structure and the side ring.

8. The seal assembly of claim 7, wherein the seal assembly is disposed in a turbine section of the gas turbine engine.

9. The seal assembly of claim 7, wherein the floating non-contact seal comprises a portion of a hydrostatic seal.

10. The seal assembly of claim 7, wherein the spring comprises a shoulder and a plurality of beams connected to and extending from the shoulder.

11. The seal assembly of claim 10, wherein the side ring has a hole, and wherein the pin extends into the shoulder and into the hole of the side ring.

12. A method comprising:
rotating a rotating structure relative to a static structure while providing a seal assembly between the rotating structure and the static structure, the seal assembly comprising:
a side ring with a first axial end-face and a second axial end-face; and
a plurality of floating non-contact seal cartridges disposed radially between the rotating structure and the static structure, wherein each cartridge of the plurality of non-contact seal cartridges includes a discrete module that is disconnected from an adjacent cartridge, wherein each floating non-contact seal cartridge is affixed to the second end-face of the side ring via a pin inserted into portions of the side ring and the floating non-contact seal cartridge, wherein each floating non-contact seal cartridge comprises:
a shoulder, wherein a first portion of the pin is inserted into a first hole in the shoulder, wherein a second portion of the pin is inserted into a second hole in the side ring, wherein the second hole is a circular hole disposed in and circumferentially surrounded by physical material of the cartridge;
a beam extending from the shoulder;
a shoe disposed radially inward of and connected to the beam; and
a seal element extending radially inward from the shoe;
flowing air from an upstream side of the seal assembly, across the plurality of floating non-contact seal cartridges, and to a downstream side of the seal assembly;
actuating the shoe at least one of radially outward and radially inward; and
supporting each floating non-contact seal with a pin.

13. The method of claim 12, further comprising preventing relative motion between the shoulder of one of the floating non-contact seal cartridges and the side ring with the pin by way of the pin affixing the floating non-contact seal cartridge to the side ring.

14. The method of claim 12, further comprising holding a radially outward surface of the shoulder against a carrier disposed radially between each of the floating non-contact seal cartridges and the static element.

15. The method of claim 12, further comprising using the seal assembly within a turbine section of a gas turbine engine.

* * * * *